US012719157B2

(12) United States Patent
Jin et al.

(10) Patent No.: US 12,719,157 B2
(45) Date of Patent: Aug. 25, 2026

(54) SATELLITE ANTENNA RADOME FOR SUBMARINES WITH HIGH WATER PRESSURE RESISTANCE

(71) Applicant: KNS INC., Daejeon (KR)

(72) Inventors: Byeong Wook Jin, Daejeon (KR); Gil Sang Ryu, Daejeon (KR); Young Sun Kim, Daejeon (KR)

(73) Assignee: KNS INC., Daejeon (KR)

( * ) Notice: Subject to any disclaimer, the term of this patent is extended or adjusted under 35 U.S.C. 154(b) by 35 days.

(21) Appl. No.: 18/795,351

(22) Filed: Aug. 6, 2024

(65) Prior Publication Data

US 2025/0392038 A1 Dec. 25, 2025

(30) Foreign Application Priority Data

Jun. 25, 2024 (KR) ........................ 10-2024-0082982

(51) Int. Cl.
*H01Q 1/42* (2006.01)
*H01Q 1/34* (2006.01)

(52) U.S. Cl.
CPC ................. *H01Q 1/42* (2013.01); *H01Q 1/34* (2013.01)

(58) Field of Classification Search
None
See application file for complete search history.

(56) References Cited

FOREIGN PATENT DOCUMENTS

| | | | | | |
|---|---|---|---|---|---|
| CN | 106508079 | B | * | 6/2014 | |
| CN | 116604896 | A | * | 8/2023 | B32B 9/04 |
| DE | 102011105426 | A1 | * | 12/2012 | F17C 1/14 |
| JP | H06283918 | A | * | 10/1994 | |
| JP | 2018152635 | A | * | 9/2018 | |
| KR | 102462750 | B1 | * | 11/2022 | H01Q 1/42 |

OTHER PUBLICATIONS

Incoloy® alloy 27-7MO Datasheet, 2005, Special Metals website (Year: 2005).*

* cited by examiner

*Primary Examiner* — Dameon E Levi
*Assistant Examiner* — Anh Ho
(74) *Attorney, Agent, or Firm* — The PL Law Group, PLLC

(57) ABSTRACT

A radome for a submarine satellite antenna according to one aspect of the invention includes a cap having a form of a hollow dome; a cap bracket secured to the cap by way of a screw-on structure, where the cap bracket has an open top and an open bottom and has a cylindrical form with its interior communicating with the interior of the cap; and a body made of a molybdenum-added stainless alloy, where the body is secured to the cap bracket by way of a screw-on structure, and the body has a cylindrical form with only its upper surface open.

5 Claims, 2 Drawing Sheets

SATELLITE ANTENNA RADOME FOR SUBMARINES WITH HIGH WATER PRESSURE RESISTANCE

CROSS-REFERENCE TO RELATED APPLICATION AND CLAIM OF PRIORITY

The present application claims the benefit of Korean Patent Application No. 10-2024-0082982, filed on Jun. 25, 2024 at the Korean Intellectual Property Office, the disclosure of which is incorporated herein by reference in its entirety.

BACKGROUND

1. Technical Field

The present invention relates to a radome for a submarine satellite antenna.

2. Description of the Related Art

The radome, which is a portmanteau word combining "radar" and "dome", generally refers to a device that can secure or rotate (also referred to as scanning) an antenna having a paraboloid shape to emit and receive a high-frequency directional waves and thereby detect obstacles or other targets.

The radome may include a cap, a cap bracket, and a body for protection from weather conditions, such as in regard to wind, rain, salt, moisture, etc., and from the external environment, such as in regard to physical impact, etc. Typically, the radome is entirely made from a plastic material, and much research effort has been focused on increasing the durability, airtightness, and sealing ability of the radome.

A radome used in a conventional satellite antenna has the ability to withstand a water pressure of about 45 bars, so that such a radome would break if a submarine were to descend to a depth of 700 m, which is the maximum operating depth of an actual submarine. However, increasing the thickness, as a measure for increasing the allowable water pressure, would result in a lowered transmittance of the radio waves. That is, a radome for a submarine satellite antenna must provide a high allowable water pressure, which is in proportion to its thickness, while also providing a high wave transmittance, which is in inverse proportion to its thickness.

SUMMARY

An aspect of the present invention, which was conceived to resolve the problem described above, is to provide a radome for a submarine satellite antenna that can withstand a water pressure of 70 bars or higher while providing an increased wave transmittance.

Other objectives of the present invention will be more clearly understood from the embodiments set forth below.

One aspect of the invention provides a radome for a submarine satellite antenna that includes: a cap having a form of a hollow dome; a cap bracket secured to the cap by way of a screw-on structure, where the cap bracket has an open top and an open bottom and has a cylindrical form with its interior communicating with the interior of the cap; and a body made of a molybdenum-added stainless alloy, where the body is secured to the cap bracket by way of a screw-on structure, and the body has a cylindrical form with only its upper surface open.

Here, the cap can be made from a fiber-reinforced plastic (FRP) material, and the cap bracket can be made from a stainless alloy.

Also, the cap can be formed with a greater thickness compared to the body.

Also, a quartz material can be layered on the exterior or the interior of the body in a thickness of 0.01~0.1 mm.

Also, the quartz material can be layered in a pattern in the form of interspaced bands and can be layered on both the exterior and the interior with gaps therebetween such that the quartz material on the exterior and the interior do not overlap. The quartz material can be layered secondarily to have a netlike form on the exterior only.

Here, the quartz material can be layered tertiarily in a honeycomb form on the interior.

An embodiment of the invention can provide a radome for a submarine satellite antenna, where the radome can withstand a water pressure of 70 bars or higher while providing an increased wave transmittance.

Other aspects, features, and advantages would be more clearly understood from the drawings, claims, and detailed description of the invention set forth below.

DETAILED DESCRIPTION OF THE INVENTION

Figure 1:
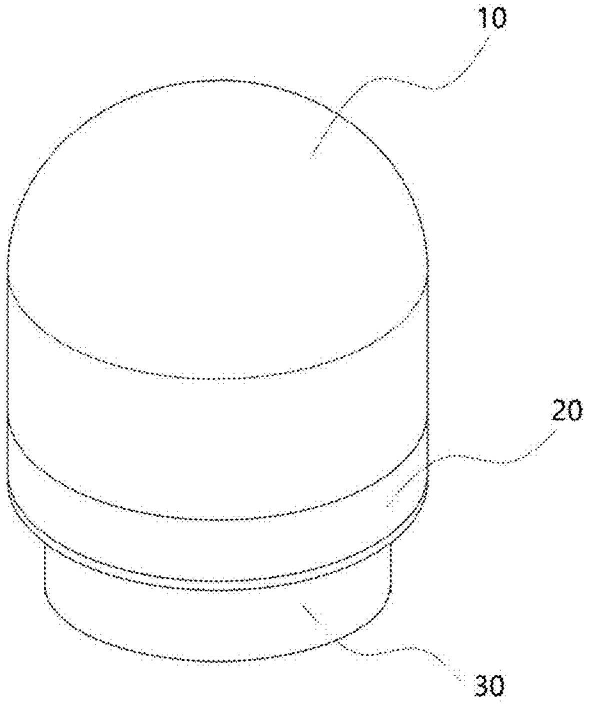
FIG. 1 is an overall view of a radome for a submarine satellite antenna according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention.

When a component is mentioned as being "coupled" or "connected" to another component, this may mean that the component is directly coupled or connected to the other component or may mean that they are coupled or connected with still another component in-between. On the other hand, if a component is mentioned as being "directly coupled" or "directly connected" to another component, this should be understood as meaning that there are no other components between the mentioned components.

While such terms as "first" and "second," etc., can be used to describe various components, such components are not to be limited by the above terms. The above terms are used only to distinguish one component from another. For example, terms such as a first threshold value, a second threshold value, etc., used below may refer to threshold values that are pre-designated to be substantially different or partially the same. Since there is a risk of confusion arising if these concepts were to be referred to by the same term "threshold value", the ordinal numbers first, second, etc., are added to more easily differentiate the concepts.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Also, the components of an embodiment described with reference to each drawing are not necessarily applied exclusively to the corresponding embodiment and can be implemented so as to be included in another embodiment as long as the spirit of the invention is maintained. Moreover, is should be appreciated that multiple embodiments can be implemented as a single combined embodiment, even though it is not expressly stated as such.

In describing the appended drawings, the same components are assigned the same or related reference numerals regardless of the figure number, and redundant explanations are omitted. In the description of the present invention, certain detailed explanations of the related art are omitted if it is deemed that they may unnecessarily obscure the essence of the invention.

FIG. 1 is an overall view of a radome for a submarine satellite antenna according to an embodiment of the invention.

Referring to FIG. 1, a radome for a submarine satellite antenna may include a cap 10, a cap bracket 20, and a body 30.

To provide a brief overview of a satellite antenna system, a satellite antenna system may track a satellite through signal recognition and stabilization functions, and the control unit of the antenna may transfer information associated with the navigation of the ship and the satellite inertia to the satellite antenna. The user can use a modem to receive emergency and aid requests and broadcasts or access telephone or Internet communications.

The satellite antenna system may include a radome, an antenna, a pedestal control unit (PCU), an inertial measurement unit (IMU), a multi-RF unit (MRU), and a pedestal. The radome can be divided into an upper radome and a lower radome, where the upper radome can protect the equipment from elements of the ocean environment, while the lower radome can protect the equipment from elements of the ocean environment and be secured to the pedestal and the body of the ship. The antenna, for which a dish-shaped parabolic antenna is typically used, is a structure for collecting or transmitting satellite signals, the PCU is a device that searches and tracks the antenna, the IMU is used to check inertia information, the MRU is a device that processes analog and digital signals received from the satellite, and the pedestal is a mechanical structure that supports the antenna and allows movement in a desired direction along each axis.

In other words, a radome is a device for blocking the entry of water, wind, and salt found in the ocean environment, so as to prevent any corrosion of the mechanisms of the antenna and protect malfunctions of electronic equipment, and may be composed of an upper portion and a lower portion (the cap 10 and body 30) to allow the mounting and maintenance of the antenna. It is desirable that the cap 10 be manufactured in an optimized manner that minimizes loss in communications between the antenna and the satellite.

The cap 10 may have the form of a hollow dome, may be made from an FRP (fiber-reinforced plastic) material, and may be structured to have an insert on its inner perimeter. That is, the cap 10 may be made of an FRP material to provide a good capturing power and an increased effective range. FRP is a material having a strong durability and a superb workability, is light and strong, and has a strong corrosion resistance and long lifespan.

The cap bracket 20 may have an open top and open bottom to have a cylindrical form of which the interior communicates with the interior of the cap. The cap bracket 20 may include a threaded portion corresponding to the insert of the cap 10 so as to allow coupling with the cap as a screw-on structure. In one example, the cap bracket 20 may preferably be made of a metal material (such as a stainless alloy, etc.) for increased durability against deep sea water pressures. Cap bracket O-rings may further be installed on portions of the cap bracket corresponding with the cap, with the threaded portion positioned in-between, so as to provide a more airtight structure.

Here, the threaded portion 21 of the cap bracket 20 that is coupled with the cap 10 as a screw-on structure may preferably be made from silicone as an airtight structure. The inner perimeter of the cap bracket 20 may have threads (not shown) formed thereon, to form a structure that allows screw-on coupling with the body 30.

The body 30 may be made of a metallic material for stronger durability and may have a cylindrical form with only its upper surface open. The body may include a space on its inside capable of housing other parts, where the space may communicate with the insides of the cap bracket 20 and the cap 10. In one example, the body 30 can be formed from a molybdenum-added stainless alloy (STS-316), and the cap bracket 20 can likewise be formed from the same alloy. In one example, the cap 10 can be made of an FRP material and thus can be formed with a greater thickness compared to that of the body 30 for increased durability.

A thread (not shown) may be formed at one end on the outer perimeter of the body 30 to form a screw-on structure with the thread (not shown) of the cap bracket 20. Similarly, body O-rings may preferably be further installed on portions of the body 30 corresponding with the cap bracket 20 for airtightness.

In producing such a radome, it may be preferable that the design be performed for protection against impact, water infiltration, and dust infiltration, the design be performed taking into account waterproofing and airtightness in consideration of the unique operating environment such as that of a submarine, the structural stabilization rate be analyzed with checks on maximum stress and maximum displacement using a structural analysis tool (ANSYS) for verification after 3D modeling, the design be performed for earthquake resistance and resonance avoidance in consideration of eigenfrequency, and the risk of damage to the equipment be minimized through iterative performance improvements until the standards of the United States military are satisfied.

Figure 2:
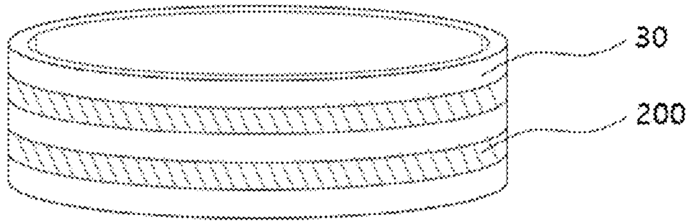
FIG. 2 and FIG. 3 illustrate the exterior of a radome body in which quartz is layered in the form of bands according to an embodiment of the invention.
Figure 3:
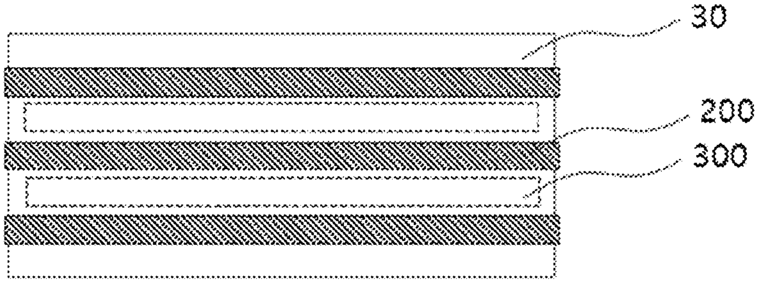
Figure 4:
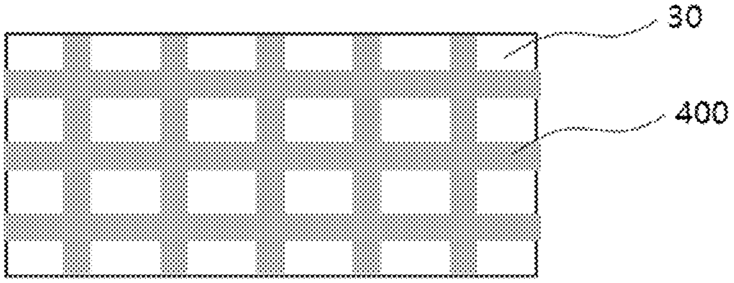
FIG. 4 illustrates the exterior of a radome body in which quartz is layered in a netlike form according to an embodiment of the invention.

FIG. 2 and FIG. 3 illustrate the exterior of a radome body in which quartz is layered in the form of bands according to an embodiment of the invention, and FIG. 4 illustrates the exterior of a radome body in which quartz is layered in a netlike form according to an embodiment of the invention.

A quartz 200 material may be layered on the outer portion of the body 30 as shown in FIG. 2 and FIG. 3.

Quartz 200, i.e. quartz glass, is generally used in the field of semiconductors and is widely used as quartzware for protecting and transporting semiconductor wafers in various processes such as etching, deposition, ion implantation, etc., as well as in parts such as focus rings, masks, etc. That is, quartz material is a material having high chemical resistance and corrosion resistance and can also exhibit high durability (such as water pressure resistance of 70 bars or higher) even when layered in a relatively small thickness on the body 30 of the radome.

The quartz 200 can be layered in a thickness of 0.1~1 mm or can be applied in a 45/−45 pattern, 0/90 pattern, etc. Of course, the invention is not limited thus. Also, the quartz 200 can be also layered over the entire exterior of the body 30, or in other examples, the quartz 200 can be layered in a pattern in the form of interspaced bands as shown in the drawings.

As illustrated in the drawings, quartz 300 may be layered also on the inside, where the quartz 200, 300 layers of the outside and inside can be layered with certain gaps in-between such that the layers do not overlap, in order that any possible performance degradation in the detection of radar reflected waves may be minimized. That is, the quartz 200, 300 layers on the outside and inside may not overlap and may be separated from one another by certain gaps, and the presence of portions on which there is no quartz 200, 300 layered can reduce the performance degradations in the capability of detecting radar reflected waves.

Referring to FIG. 4, which illustrates another example, the quartz 400 can be layered secondarily such that a netlike form is obtained on the exterior only. That is, the quartz 200 may be layered in the form of lateral and longitudinal bands for the purpose of preventing damage by strong external forces.

According to another embodiment of the invention, the quartz can be layered tertiarily on the interior in a honeycomb form. The honeycomb form can allow the radome to readily withstand strong forces applied from the exterior and, unlike the lateral and longitudinal bands, can distribute the stress over the structure, so as to prevent the radome from being damaged inwardly.

While the foregoing provides a description with reference to a preferred embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A radome for a submarine satellite antenna, the radome comprising:

a cap having a form of a hollow dome;

a cap bracket secured to the cap by way of a screw-on structure, the cap bracket having an open top and an open bottom and having a cylindrical form with an interior thereof communicating with an interior of the cap;

a body made of a molybdenum-added stainless alloy, the body secured to the cap bracket by way of a screw-on structure, the body having a cylindrical form with only an upper surface thereof open; and a quartz material layered on both an exterior and an interior of the body with gaps therebetween such that the quartz material on the exterior and the interior do not overlap.

2. The radome of claim 1, wherein the cap is made from a fiber-reinforced plastic (FRP) material, and the cap bracket is made from a stainless alloy.

3. The radome of claim 2, wherein the cap is formed with a greater thickness compared to the body.

4. The radome of claim 1, wherein the quartz material is layered in a thickness of 0.01~0.1 mm.

5. The radome of claim 4, wherein the quartz material is layered in a pattern in a form of interspaced bands.

* * * * *